United States Patent [19]
Schuessler et al.

[11] Patent Number: 5,811,787
[45] Date of Patent: Sep. 22, 1998

[54] TWO-DIMENSIONAL BAR CODE SYMBOLOGY USING IMPLICIT VERSION INFORMATION ENCODING

[75] Inventors: Frederick Schuessler, Mount Sinai; Kevin Hunter; Sundeep Kumar, both of East Setauket; Cary Chu, Port Jefferson, all of N.Y.

[73] Assignee: Symbol Technologies, Inc., Holtsville, N.Y.

[21] Appl. No.: 762,630

[22] Filed: Dec. 9, 1996

[51] Int. Cl.[6] .............. G06K 19/06; G06K 7/10; G06K 5/00
[52] U.S. Cl. .................. 235/494; 235/462; 235/470; 235/437
[58] Field of Search .................. 235/462, 470, 235/437, 494

[56] References Cited

U.S. PATENT DOCUMENTS

| | | | |
|---|---|---|---|
| 4,251,798 | 2/1981 | Swartz et al. | 340/146.3 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,760,248 | 7/1988 | Swartz et al. | 235/472 |
| 4,794,239 | 12/1988 | Allais | 235/462 |
| 5,304,786 | 4/1994 | Pavlidis et al. | 235/462 |
| 5,304,787 | 4/1994 | Wang | 235/494 |
| 5,504,322 | 4/1996 | Pavlidis et al. | 235/494 |
| 5,550,363 | 8/1996 | Obata | 235/494 |
| 5,576,528 | 11/1996 | Chew et al. | 235/494 |

*Primary Examiner*—Donald T. Hajec
*Assistant Examiner*—Jacob Eisenberg

[57] ABSTRACT

A electro-optical memory includes a substrate on which is printed (or otherwise inscribed) a complex symbol or "label" or "bar code" of a high density two-dimensional symbology. The bar code contains component symbols or "codewords" which are placed in row and column formation, with a variable number of codewords per row, and a variable number of rows. The symbology utilizes implicit bar code encoding scheme for implicit encoding the number of rows and the number of columns of codewords, as well as a predetermined amount of error correction. The symbology is capable of supporting a fixed number of bar code variants, with each variant having a predetermined number of rows and columns of codewords, and a predetermined error correction capability. For some codewords the implicit encoding scheme is combined with a gray coding scheme to reduce the inter-row codeword crosstalk. Systems are used for printing and decoding the bar codes of the invented symbology in applications where improved storage density and tight real estate requirements are of utmost importance. A memory may be used in conjunction with a scanner and a suitable control system in a number of applications, e.g., robotics operations or automated object searching.

57 Claims, 11 Drawing Sheets

| $RAP_{19}$ | $Cluster_0$ C.W. | $Cluster_0$ C.W. | $RAP_{33}$ | $Cluster_0$ C.W. | $Cluster_0$ C.W. | $RAP_{02}$ | (Row 19) |
|---|---|---|---|---|---|---|---|
| $RAP_{20}$ | $Cluster_3$ C.W. | $Cluster_3$ C.W. | $RAP_{34}$ | $Cluster_3$ C.W. | $Cluster_3$ C.W. | $RAP_{03}$ | (Row 20) |
| $RAP_{21}$ | $Cluster_6$ C.W. | $Cluster_6$ C.W. | $RAP_{35}$ | $Cluster_6$ C.W. | $Cluster_6$ C.W. | $RAP_{04}$ | (Row 21) |
| $RAP_{22}$ | $Cluster_0$ C.W. | $Cluster_0$ C.W. | $RAP_{36}$ | $Cluster_0$ C.W. | $Cluster_0$ C.W. | $RAP_{05}$ | (Row 22) |
| $RAP_{23}$ | $Cluster_3$ C.W. | $Cluster_3$ C.W. | $RAP_{37}$ | $Cluster_3$ C.W. | $Cluster_3$ C.W. | $RAP_{06}$ | (Row 23) |

| Number of Row Address Cols | Number of Data Cols (c) | Number of Rows (r) | Total CWs in Data Region | Number of E.C. Cws (k) | Pcnt of CWs for E.C. | Number of CWs for Data |
|---|---|---|---|---|---|---|
| 2 | 1 | 14 | 14 | 6 | 0.43 | 6 |
| 2 | 1 | 17 | 17 | 6 | 0.35 | 9 |
| 2 | 1 | 20 | 20 | 7 | 0.35 | 11 |
| 2 | 1 | 24 | 24 | 7 | 0.29 | 15 |
| 2 | 1 | 28 | 28 | 7 | 0.25 | 19 |
| 2 | 2 | 14 | 28 | 8 | 0.29 | 18 |
| 2 | 2 | 17 | 34 | 9 | 0.26 | 23 |
| 2 | 2 | 20 | 40 | 10 | 0.25 | 28 |
| 2 | 2 | 23 | 46 | 12 | 0.26 | 32 |
| 2 | 2 | 26 | 52 | 14 | 0.27 | 36 |
| 3 | 3 | 14 | 42 | 11 | 0.26 | 29 |
| 3 | 3 | 18 | 54 | 14 | 0.26 | 38 |
| 3 | 3 | 22 | 66 | 17 | 0.26 | 47 |
| 3 | 3 | 26 | 78 | 20 | 0.26 | 56 |
| 3 | 3 | 30 | 90 | 23 | 0.26 | 65 |
| 3 | 3 | 34 | 102 | 26 | 0.25 | 74 |
| 3 | 3 | 38 | 114 | 29 | 0.25 | 83 |
| 3 | 4 | 14 | 56 | 14 | 0.25 | 40 |
| 3 | 4 | 18 | 72 | 18 | 0.25 | 52 |
| 3 | 4 | 22 | 88 | 22 | 0.25 | 64 |
| 3 | 4 | 26 | 104 | 26 | 0.25 | 76 |
| 3 | 4 | 30 | 120 | 30 | 0.25 | 88 |
| 3 | 4 | 34 | 136 | 34 | 0.25 | 100 |
| 3 | 4 | 38 | 152 | 38 | 0.25 | 112 |

| Cluster | Left RAP | One-Column | | | One Data Columns | | | | Two Data Columns | | | | | |
|---|---|---|---|---|---|---|---|---|---|---|---|---|---|---|
| | All Vers | C1R1 Dist:0 | | | C1R2 Dist:7 | | | | C2R1 Dist:0 | | | C2R2 Dist:7 | | |
| | | | 1x28 | 1x24 | | 1x20 | 1x17 | 1x14 | | 2x26 | 2x23 | | 2x20 | 2x17 | 2x14 |
| 0 | 1 | 1 | 1 | | 8 | | 1 | | 1 | 1 | | 8 | | 1 | |
| 3 | 2 | 2 | 2 | | 9 | | 2 | | 2 | 2 | | 9 | | 2 | |
| 6 | 3 | 3 | 3 | | 10 | | 3 | | 3 | 3 | | 10 | | 3 | |
| 0 | 4 | 4 | 4 | | 11 | | 4 | | 4 | 4 | | 11 | | 4 | |
| 3 | 5 | 5 | 5 | | 12 | | 5 | | 5 | 5 | | 12 | | 5 | |
| 6 | 6 | 6 | 6 | | 13 | 1 | 6 | | 6 | 6 | | 13 | 1 | 6 | |
| 0 | 7 | 7 | 7 | | 14 | 2 | 7 | | 7 | 7 | | 14 | 2 | 7 | |
| 3 | 8 | 8 | 8 | | 15 | 3 | 8 | | 8 | 8 | | 15 | 3 | 8 | |
| 6 | 9 | 9 | 9 | | 16 | 4 | 9 | | 9 | 9 | | 16 | 4 | 9 | |
| 0 | 10 | 10 | 10 | | 17 | 5 | 10 | | 10 | 10 | | 17 | 5 | 10 | |
| 3 | 11 | 11 | 11 | 1 | 18 | 6 | 11 | | 11 | 11 | 1 | 18 | 6 | 11 | |
| 6 | 12 | 12 | 12 | 2 | 19 | 7 | 12 | | 12 | 12 | 2 | 19 | 7 | 12 | |
| 0 | 13 | 13 | 13 | 3 | 20 | 8 | 13 | | 13 | 13 | 3 | 20 | 8 | 13 | |
| 3 | 14 | 14 | 14 | 4 | 21 | 9 | 14 | | 14 | 14 | 4 | 21 | 9 | 14 | |
| 6 | 15 | 15 | 15 | 5 | 22 | 10 | 15 | | 15 | 15 | 5 | 22 | 10 | 15 | |
| 0 | 16 | 16 | 16 | 6 | 23 | 11 | 16 | | 16 | 16 | 6 | 23 | 11 | 16 | |
| 3 | 17 | 17 | 17 | 7 | 24 | 12 | 17 | | 17 | 17 | 7 | 24 | 12 | 17 | |
| 6 | 18 | 18 | 18 | 8 | 25 | 13 | | | 18 | 18 | 8 | 25 | 13 | | |
| 0 | 19 | 19 | 19 | 9 | 26 | 14 | | | 19 | 19 | 9 | 26 | 14 | | |
| 3 | 20 | 20 | 20 | 10 | 27 | 15 | | | 20 | 20 | 10 | 27 | 15 | | |
| 6 | 21 | 21 | 21 | 11 | 28 | 16 | | | 21 | 21 | 11 | 28 | 16 | | |
| 0 | 22 | 22 | 22 | 12 | 29 | 17 | | | 22 | 22 | 12 | 29 | 17 | | |
| 3 | 23 | 23 | 23 | 13 | 30 | 18 | | | 23 | 23 | 13 | 30 | 18 | | |
| 6 | 24 | 24 | 24 | 14 | 31 | 19 | | 1 | 24 | 24 | 14 | 31 | 19 | | 1 |
| 0 | 25 | 25 | 25 | 15 | 32 | 20 | | 2 | 25 | 25 | 15 | 32 | 20 | | 2 |
| 3 | 26 | 26 | 26 | 16 | 33 | | | 3 | 26 | 26 | 16 | 33 | | | 3 |
| 6 | 27 | 27 | 27 | 17 | 34 | | | 4 | 27 | | 17 | 34 | | | 4 |
| 0 | 28 | 28 | 28 | 18 | 35 | | | 5 | 28 | | 18 | 35 | | | 5 |
| 3 | 29 | 29 | | 19 | 36 | | | 6 | 29 | | 19 | 36 | | | 6 |
| 6 | 30 | 30 | | 20 | 37 | | | 7 | 30 | | 20 | 37 | | | 7 |
| 0 | 31 | 31 | | 21 | 38 | | | 8 | 31 | | 21 | 38 | | | 8 |
| 3 | 32 | 32 | | 22 | 39 | | | 9 | 32 | | 22 | 39 | | | 9 |
| 6 | 33 | 33 | | 23 | 40 | | | 10 | 33 | | 23 | 40 | | | 10 |
| 0 | 34 | 34 | | 24 | 41 | | | 11 | 34 | | | 41 | | | 11 |
| 3 | 35 | 35 | | | 42 | | | 12 | 35 | | | 42 | | | 12 |
| 6 | 36 | 36 | | | 43 | | | 13 | 36 | | | 43 | | | 13 |
| 0 | 37 | 37 | | | 44 | | | 14 | 37 | | | 44 | | | 14 |
| 3 | 38 | 38 | | | 45 | | | | 38 | | | 45 | | | |

FIG. 5a

| Left Cluster RAP | | Three/Four Data Columns | | | | | | | | | |
|---|---|---|---|---|---|---|---|---|---|---|---|
| | | Center RAP | Right RAPs | | | | | | | | |
| | | All Vers | C4R1 Dist:14 | C4R1 Dist:21 | C4R2 Dist:28 | | C4R3 Dist:35 | | C4R4 Dist:42 | | |
| | | | | ¾×38 | | ¾×34 | ¾×14 | ¾×30 | ¾×26 | | ¾×22 | ¾×18 |
| 0 | 1 | 15 | 36 | 1 | 43 | 1 | 50 | | 1 | 5 | 1 | |
| 3 | 2 | 16 | 37 | 2 | 44 | 2 | 51 | | 2 | 6 | 2 | |
| 6 | 3 | 17 | 38 | 3 | 45 | 3 | 52 | | 3 | 7 | 3 | |
| 0 | 4 | 18 | 39 | 4 | 46 | 4 | 1 | | 4 | 8 | 4 | |
| 3 | 5 | 19 | 40 | 5 | 47 | 5 | 2 | | 5 | 9 | 5 | |
| 6 | 6 | 20 | 41 | 6 | 48 | 6 | 3 | | 6 | 10 | 6 | |
| 0 | 7 | 21 | 42 | 7 | 49 | 7 | 4 | | 7 | 11 | 7 | |
| 3 | 8 | 22 | 43 | 8 | 50 | 8 | 5 | | 8 | 12 | 8 | |
| 6 | 9 | 23 | 44 | 9 | 51 | 9 | 6 | | 9 | 13 | 9 | |
| 0 | 10 | 24 | 45 | 10 | 52 | 10 | 7 | | 10 | 14 | 10 | 1 |
| 3 | 11 | 25 | 46 | 11 | 1 | 11 | 8 | | 11 | 15 | 11 | 2 |
| 6 | 12 | 26 | 47 | 12 | 2 | 12 | 9 | 1 | 12 | 16 | 12 | 3 |
| 0 | 13 | 27 | 48 | 13 | 3 | 13 | 10 | 2 | 13 | 17 | 13 | 4 |
| 3 | 14 | 28 | 49 | 14 | 4 | 14 | 11 | 3 | 14 | 18 | 14 | 5 |
| 6 | 15 | 29 | 50 | 15 | 5 | 15 | 12 | 4 | 15 | 19 | 15 | 6 |
| 0 | 16 | 30 | 51 | 16 | 6 | 16 | 13 | 5 | 16 | 20 | 16 | 7 |
| 3 | 17 | 31 | 52 | 17 | 7 | 17 | 14 | 6 | 17 | 21 | 17 | 8 |
| 6 | 18 | 32 | 1 | 18 | 8 | 18 | 15 | 7 | 18 | 22 | 18 | 9 |
| 0 | 19 | 33 | 2 | 19 | 9 | 19 | 16 | 8 | 19 | 23 | 19 | 10 |
| 3 | 20 | 34 | 3 | 20 | 10 | 20 | 17 | 9 | 20 | 24 | 20 | 11 |
| 6 | 21 | 35 | 4 | 21 | 11 | 21 | 18 | 10 | 21 | 25 | 21 | 12 |
| 0 | 22 | 36 | 5 | 22 | 12 | 22 | 19 | 11 | 22 | 26 | 22 | 13 |
| 3 | 23 | 37 | 6 | 23 | 13 | 23 | 20 | 12 | 23 | 27 | | 14 |
| 6 | 24 | 38 | 7 | 24 | 14 | 24 | 21 | 13 | 24 | 28 | | 15 |
| 0 | 25 | 39 | 8 | 25 | 15 | 25 | 1 | 22 | 25 | 14 | 29 | 16 |
| 3 | 26 | 40 | 9 | 26 | 16 | 26 | 2 | 23 | 26 | 15 | 30 | 17 |
| 6 | 27 | 41 | 10 | 27 | 17 | 27 | 3 | 24 | 27 | 16 | 31 | 18 |
| 0 | 28 | 42 | 11 | 28 | 18 | 28 | 4 | 25 | 28 | 17 | 32 | |
| 3 | 29 | 43 | 12 | 29 | 19 | 29 | 5 | 26 | 29 | 18 | 33 | |
| 6 | 30 | 44 | 13 | 30 | 20 | 30 | 6 | 27 | 30 | 19 | 34 | |
| 0 | 31 | 45 | 14 | 31 | 21 | 31 | 7 | 28 | | 20 | 35 | |
| 3 | 32 | 46 | 15 | 32 | 22 | 32 | 8 | 29 | | 21 | 36 | |
| 6 | 33 | 47 | 16 | 33 | 23 | 33 | 9 | 30 | | 22 | 37 | |
| 0 | 34 | 48 | 17 | 34 | 24 | 34 | 10 | 31 | | 23 | 38 | |
| 3 | 35 | 49 | 18 | 35 | 25 | | 11 | 32 | | 24 | 39 | |
| 6 | 36 | 50 | 19 | 36 | 26 | | 12 | 33 | | 25 | 40 | |
| 0 | 37 | 51 | 20 | 37 | 27 | | 13 | 34 | | 26 | 41 | |
| 3 | 38 | 52 | 21 | 38 | 28 | | 14 | 35 | | | 42 | |

FIG. 5b

| | | | | | (Row 19) |
| --- | --- | --- | --- | --- | --- |
| RAP$_{19}$ | Cluster$_0$ C.W. | Cluster$_0$ C.W. | RAP$_{33}$ | Cluster$_0$ C.W. | RAP$_{02}$ |
| RAP$_{20}$ | Cluster$_3$ C.W. | Cluster$_3$ C.W. | RAP$_{34}$ | Cluster$_3$ C.W. | RAP$_{03}$ | (Row 20)
| RAP$_{21}$ | Cluster$_6$ C.W. | Cluster$_6$ C.W. | RAP$_{35}$ | Cluster$_6$ C.W. | RAP$_{04}$ | (Row 21)
| RAP$_{22}$ | Cluster$_0$ C.W. | Cluster$_0$ C.W. | RAP$_{36}$ | Cluster$_0$ C.W. | RAP$_{05}$ | (Row 22)
| RAP$_{23}$ | Cluster$_3$ C.W. | Cluster$_3$ C.W. | RAP$_{37}$ | Cluster$_3$ C.W. | RAP$_{06}$ | (Row 23)

FIG. 6

TWO-DIMENSIONAL BAR CODE SYMBOLOGY USING IMPLICIT VERSION INFORMATION ENCODING

This application is related to U.S. Pat. No. 5,304,786 and pending U.S. patent application Ser. No. 08/734,438, filed Oct. 16, 1996, which incorporated by reference herein.

FIELD OF THE INVENTION

The present invention relates to a two dimensional bar code symbol consisting of a variable number of component symbols or "codewords," with some codewords having bar code version information implicitly encoded within, but where no codewords explicitly contain version information.

BACKGROUND OF THE INVENTION

Bar Code Symbology

Bar codes are well known in the art. Today, bar codes are used in just about every type of business application: point-of-sale, retail, warehousing, etc. Bar codes are printed on individual items and on containers enclosing a number of items. Bar codes carry information encoded into bars and spaces of various width, arranged in a predetermined patterns. The bars and spaces are made up of unit elements called modules. A module has a specified height and width. Width is usually called the horizontal dimension of the module. When a bar code is scanned by a laser scanner, bar code modules are usually crossed by the scanning beam along its horizontal dimension. The relative size of a bar coded label is determined by the type of coding used, as are the actual sizes of the label's individual bars and spaces. The size of the bar code is also directly proportional to the amount of information which is stored in that bar code. Conversely, the amount of information is constrained by the size limitations on the bar code. Bar codes usually get scanned via a bar code scanning system, and the encoded information gets extracted and decoded by the system's processing means. Bar code reading can be accomplished by scanning across the bar code with a laser scanner, a charged coupled device (CCD), or a solid state imaging device(SSI). Bar code reading systems are known in the art and have been disclosed, for example, in U.S. Pat. No. 4,251,798; 4,360, 798; 4,369,361; 4,387,297; 4,409,470 and 4,460,120.

A number of different one-dimensional bar code symbologies (encodation schemes) exist. These symbologies include UPC/EAN, Code 39, Code 128, Codabar and Interleaved 2 of 5. Due to their low information density storage capacity these types of bar codes can carry only a limited amount of information, on the order of ten to twenty letters or digits. This information is usually an index to a file or a data base where more comprehensive information is stored.

Symbologies of (n,k) Type

Some bar codes are referred to as belonging to the (n,k) family. A code of (n,k) type uniquely represents characters by a string of n modules containing k bars and k spaces. The UPC symbology is an example of a (7,2) code, i.e., n=7 and k=2.

Two-dimensional bar codes carry more information per substrate area than linear bar codes. Some two-dimensional bar code symbologies are just an extension of one-dimensional bar codes, in that they are formed by stacking rows of one-dimensional bar codes and typically placing a horizontal line between each row. In order to keep the same vertical dimension of the overall bar code, the height of each row is smaller then the normal height of a one-dimensional bar code. U.S. Pat. No. 4,794,239.

There exists a number of different two-dimensional symbologies. Some of the symbologies are: Code49, 16K Code, Codabar, Supercode, etc. The PDF417 symbology is another type of two dimensional bar code symbology that is used when we need to encode a greater amount of information within a limited amount of space, thus giving us a higher information density encodation scheme. U.S. Pat. No. 5,304, 786. A "stacked" two-dimensional bar code, such as PDF417, uses a row/column spacial arrangement of codewords. The information is usually broken up and encoded into individual "codewords" which, when decoded, are used to recompose the encoded information. When a bar code is scanned by a laser scanner or a CCD scanner, the scanner's bar code processing means must be able to determine the relative position of each scanned codeword. Not only must it be able to properly decode the information contained in the codeword, it must also determine where the codeword fits in relation to other codewords within its row and with respect to other rows of codewords.

One of the limiting factors in optimizing the density of "stacked" two-dimensional bar codes is the need to explicitly encode dimensional information into some of the codewords. Because a standard two-dimensional bar code can have many "versions", i.e. permutations of the number of rows and columns of codewords, the bar code size, or version information must be explicitly encoded into some of its codewords. Otherwise, if one edge of the bar code is damaged, it would become difficult to correctly establish the row and column location when decoding the symbol. These version information codewords are typically the same height and width as the data carrying codewords. In order to avoid the possibility of misdecode, the number of codewords in a bar code must be known before attempting to perform error correction. Thus, the explicit version information codewords must be encoded multiple times within the symbol, otherwise a single spot of bar code damage could render the bar code undecodable. As an example, the PDF417 code requires the explicit version information to be encoded in every row. Being able to implicitly encode the size, or version of the bar code label while eliminating the explicit version information codewords will increase the label data storage efficiency.

Another limitation of the present two-dimensional bar code symbologies is the need to print start and stop characters at each end of every row. These characters help determine the scanning direction of the laser spot of the laser bar code scanner relative to the symbol. Eliminating or reducing the size of the start and stop characters while being able to determine the scanning direction will also improve the bar code data storage efficiency.

One of the limiting factors in optimizing the density of "stacked" two-dimensional bar codes is the signal cross-talk between the adjacent rows of bars and spaces, caused by the scanning spot illuminating two adjacent rows. The adjacent row indicator codewords of the PDF417 code may contain completely different bar space patterns, thus creating an indeterminate signal when scanned at the boundary between them, and making it difficult to determine which row of the bar code has been scanned. If the beam, for example, falls ½ within one row and ½ within another row, the row cross-talk may produce an undecodable signal, or even worse, produce a decoding error.

One way to achieve this result is to decrease the scanning spot height. Reducing the scanning spot height relative to the module height lowers the probability of the scanning spot crossing two rows of bars and spaces at the same time. But, this approach has some limitations and disadvantages associated with it. In order to optically resolve the bars and spaces of a bar code, while scanning along the row of modules, the horizontal dimension of a scanning spot of a bar code scanner is dictated by the horizontal module size of the scanned bar code. The horizontal spot size, in turn, places a restriction upon the smallest vertical dimensions of the scanning spot. Therefore, further reduction of the vertical dimension of the scanning spot in order to reduce the interrow cross-talk is not always possible. Even when reduction of the vertical size of the scanning spot is possible, it is not always advantageous. Having a taller spot helps to integrate the printing noise due to a greater spot coverage area.

The other way to reduce the ratio is to increase the row height. This, in turn, places a lower limit on the vertical dimension of any single row of bars and spaces, and dictates the overall label height. The PDF417 specification, for example, dictates that the smallest vertical to horizontal module size ratio of any module is three.

Matrix codes provide high information density storage capacity, but are also susceptible to interrow cross-talk problem. In addition, matrix codes are not decodable by a laser-scanner and therefore may not be used in many laser scanning applications.

A bar code encodation scheme which eliminates or reduces the bar code start and stop characters, eliminates the bar code size carrying codewords, implicitly encodes the bar code version, and improves interrow signal cross-talk is needed to improve the bar code's information density storage capacity. This, in turn, will open up new bar code applications where traditional two-dimensional bar codes could not be used due to their limiting real estate requirements.

SUMMARY OF THE INVENTION

The invention relates to a two dimensional bar code printed in a row/column matrix pattern encoded using a symbology that allows printing of bar codes in a limited number of variants. Each variant can have up to three components. Those components are: a predetermined number of rows of codewords, a predetermined number of columns of codewords, and a predetermined error correction level. Each variant of the invented symbology has at least one of the three components implicitly encoded within the bar code.

There are two types of codewords: row address codewords and data codewords. Each codeword is made up of a pattern of bars and spaces. The smallest element of any bar or space is a module. A data codeword has some of the source text data encoded into it. Instead of some data information, the data codewords can also have error correction encoded into them. A row address codeword carries some indication of a row address encoded into it. Each row address codeword has a unique bar/space pattern and belongs to a set of row address codewords. The bar code has at least one column of row address codewords, and at least one column of data codewords. Row address codewords within a row address column form a subset of the complete set of defined row address codewords. Each row address subset implicitly encodes at least one of the three components of the bar code variant. Some bar code variants may have partially overlapping row subsets. In the preferred embodiment, the row address subset implicitly encodes a bar code variant having a predetermined number of rows of codewords.

Some row address codewords have directionally unambiguous bar/space patterns. These codewords are called unambiguous row address codewords. These row address codewords help to determine the left-to-right or right-to-left direction of the scanning laser beam. Having unique unambiguous row address codewords allows for various algorithms determining the direction of the scan at any time after the first unambiguous row address codeword has been encountered. This, it turn, allows for elimination of the stop and start patterns and a reduction in a width of any row of codewords. In the preferred embodiment, the number of usable row address bar/space patterns is maximized by allowing the use of both ambiguous and unambiguous bar/space patterns. When some of the row address codewords are not used by any one of the variants, some of the ambiguous codewords become unambiguous, because they can not be confused with any used row address codeword.

When more than one column of row address codewords is used, every row will contain a unique sequential horizontal grouping of the row address codewords. Each unique sequential grouping of the row address codewords also implicitly encodes at least one of the three components of the bar code variant. In the preferred embodiment, the unique sequential grouping of the row address codewords implicitly encodes a bar code variant having a predetermined number of columns of codewords and identifies a subset of predetermined row number variant as well. A majority of the unique sequential groupings of row address codewords include at least one row address codeword having an unambiguous bar/space pattern.

By combining unique row address subsets with unique sequential groupings of the row address codewords, one can implicitly encode two of the three components of the bar code variant. In the preferred embodiment, the two implicitly encoded components are: the number of rows of codewords and the number of columns of codewords. The third component, error correction level, is fixed for a given combination of the first two components.

In the preferred embodiment of the invention the row address codewords are encoded using cyclical gray code. Gray code minimizes the difference between the adjacent patterns, ideally by one module. In addition, because the gray coded codewords are used in a sequence, any ambiguity as to the correct pattern is reduced to one of the two sequential patterns. Various types of gray codes could be used, including an (n,k) gray code, where n is the number of modules, k is the number of bars and is also the number of spaces in a pattern. The preferred embodiment uses a (9,3) gray code for encoding row address codewords. Using gray code to encode row indicators reduces the interrow crosstalk noise, when the scanning spot illuminates modules from two adjacent rows at the same time. This, in turn allows for a reduction of the vertical dimension of the bar code having any given number of rows. Because (n,k) coding causes the row address codewords to start with a bar and to end with a space, the symbology utilizes a single module bar as a stop pattern on the right hand side of the rightmost row address column.

PDF417 symbol characters are used to encode the data error correction information into the data codewords in the preferred embodiment of the invention.

Using gray coded row address codewords for row numbering and for implicit encoding of the number of rows and columns of codewords, in combination with PDF417 codewords for data and error level encoding, allows one to increase the information storage density.

The object of the invention is to increase the information density of a bar code.

Another object of the invention is to encode the version information of the symbology by implicitly encoding one of the three components of the bar code version.

Another object of the invention is to encode the version of the symbology by implicitly encoding two of the three components of the bar code version.

Another object of the invention is to eliminate the stop and start patterns.

Another object of the invention is to replace a stop pattern with a single bar one module wide.

Another object of the invention is to combine an implicit bar code version encodation scheme and a gray code encodation scheme with another two-dimensional bar code encodation method.

Another object of the invention is to combine an implicit bar code version encodation scheme and a gray code encodation scheme with the PDF417 two-dimensional bar code encodation method.

Another object of the invention is to combine an implicit bar code version encodation scheme, a (n,k) gray code encodation scheme and the PDF417 two-dimensional bar code encodation method.

Another object of the invention is to combine an implicit bar code version encodation scheme, a (9,3)gray code encodation scheme and the PDF417 two-dimensional bar code encodation method.

Another object of the invention is to devise a system for printing labels which combine an implicit bar code version encodation scheme, a gray code encodation scheme and the PDF417 two-dimensional bar code encodation method.

Another object of the invention is to devise a bar code reader for reading labels that combine an implicit bar code version encodation scheme, a gray code encodation scheme and the PDF417 two-dimensional bar code encodation method.

Another object of the invention is to devise a bar code reader for reading labels, that combine an implicit bar code version encodation scheme, a gray code encodation scheme and the PDF417 two-dimensional bar code encodation method, using various scanning patterns.

Another object of the invention is to devise a decoding method for decoding labels encoded using an implicit bar code version encodation method.

Another object of the invention is to devise a decoding method for decoding labels encoded using an implicit bar code version encodation method, a gray code encodation scheme and a two-dimensional bar code encodation method.

Another object of the invention is to devise a system for performing functions based upon the information encoded by combining implicit bar code version encodation method, a gray code encodation scheme and the PDF 417 two-dimensional bar code encodation method.

In keeping with these objects of the invention and others which will become apparent hereinafter, the invention comprises a new symbology that combines the advantages of each of its components. The result is a new symbology capable of encoding large amounts of data into a relatively small substrate area without sacrificing encodation security or increasing the probability of error.

A new decode algorithm is also invented that takes advantage of the special features of the new symbology.

A printing device and a scanning device associated with the new symbology are described accordingly.

A system for utilization of the advantages provided by the new bar code symbology is presented.

BRIEF DESCRIPTION OF THE DRAWINGS

FIG. 5a is a tabular representation of one and two data column MicroPDF417 variants and the relationship between the different row address columns.

FIG. 5b is a tabular representation of three and four data column MicroPDF417 variants and the relationship between the different row address columns.

FIG. 6 is a representation of a scan line crossing multiple rows of a four column MicroPDF417 variant.

DETAILED DESCRIPTION OF THE PREFERRED EMBODIMENT

Figures 1, 4:
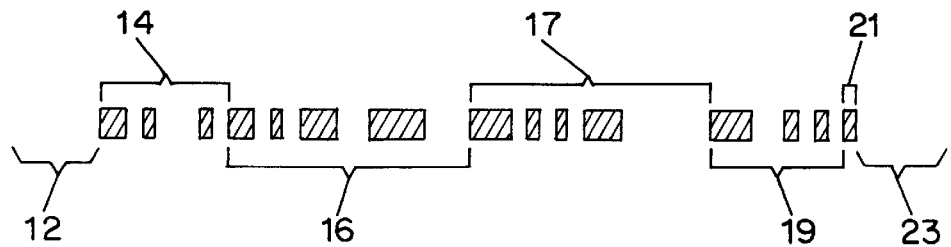
FIG. 1 is a table of the MicroPDF417 variants and their characteristics according to the present invention.
FIG. 4 is an illustration of an individual row of one of the MicroPDF417 bar code variants printed in accordance with the present invention.
Figure 2A:
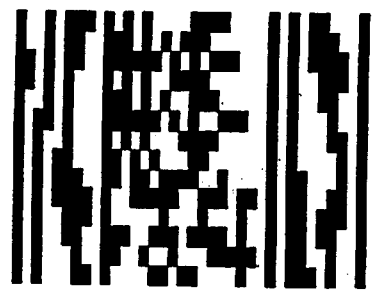
FIGS. 2a, 2b, 2c, 2d, 2e and 2f is an illustration if some of the MicroPDF417 bar code variants printed according to the present invention.
Figure 2B:
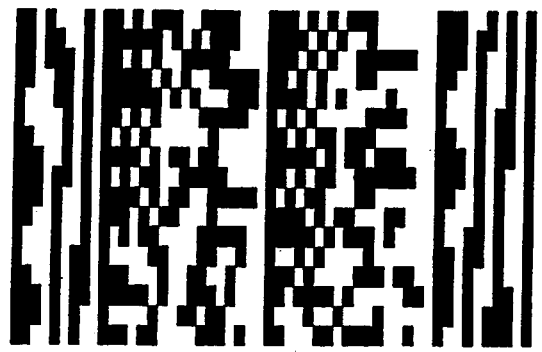
Figure 2C:
Figure 2D:
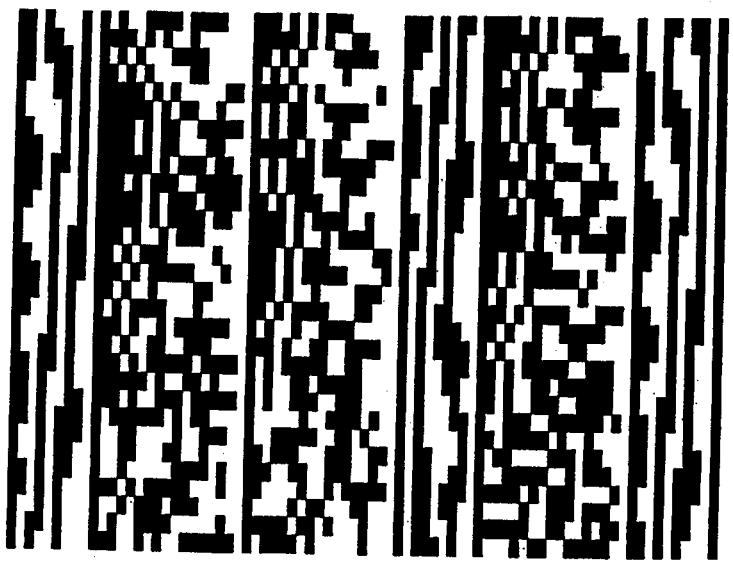
Figure 2E:
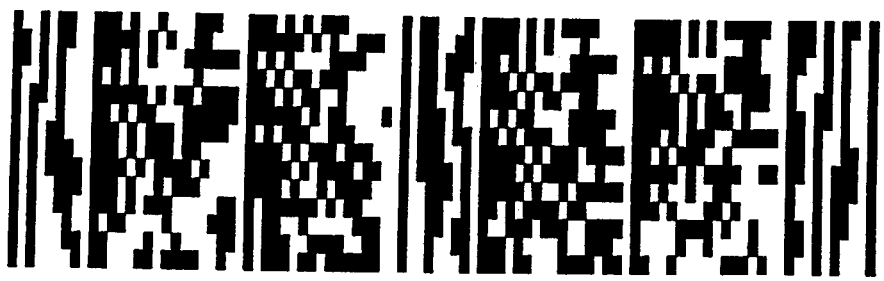
Figure 2F:
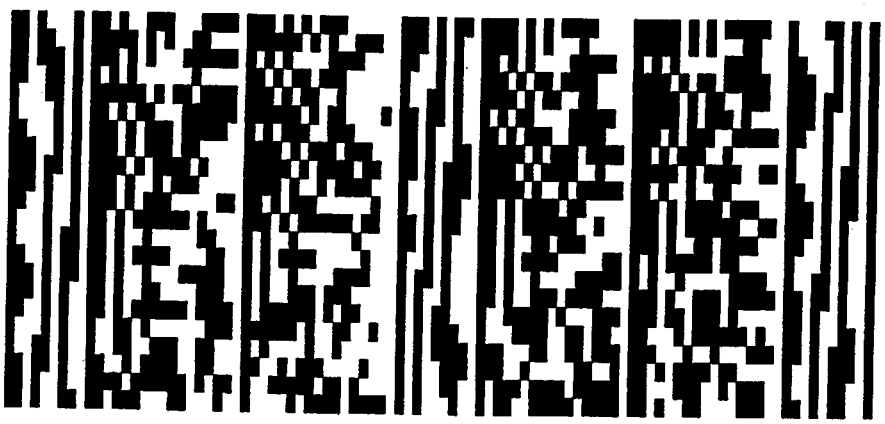

The invention relates to a two dimensional bar code printed in a row/column matrix pattern encoded using a symbology that allows printing of bar codes in a limited number of variants. The bar code consists of rows and columns of the two types of codewords: the row address codewords and the data codewords. The row address codewords are located in the row address columns of the bar code, and the data codewords are located in the data columns of the bar code. Each codeword is made up of a pattern of bars and spaces. The embodiment uses the PDF417 encoding scheme to encode the data codewords with either source text data or error correction information. The set of the PDF417 codewords consists of three clusters of codewords, with each cluster comprising a full character set. No two adjacent rows of codewords have data codewords belonging to the same cluster. The PDF417 code is described in U.S. Pat. No. 5,304,786. The preferred embodiment of the invention is called a MicroPDF417 code. MicroPDF417 symbols may only be built from a certain predefined combinations of a number of rows and columns of codewords, and only with a predetermined number of error correction codewords. In order to reduce symbol width and to improve readability at row heights of 2x and below, with x being the width of the bar/space module, MicroPDF417 replaces the standard Start and Stop patterns, and Left and Right Row Indicators of the PDF417 code, with special MicroPDF417 Row Address patterns. The Row Address patterns indicate each row number, but unlike the standard PDF417 Row Indicators, the Row Address patterns do not explicitly encode the number of rows (r), the number of columns (c), nor the number of error correcting codewords(k). For this reason, MicroPDF417 only supports fixed combinations of r, c, and k. Each combination defines a single bar code variant. The variant information is encoded implicitly within the bar code and no single codeword explicitly encodes any one of the three variant components. The number of error correction codewords, for example, for each of the bar codes is implicitly determined by the combination of the number of rows and the number of columns of codewords within the corresponding bar code. MicroPDF417 symbols consist of either one, two, three or four PDF417 data codeword columns ("data columns"), plus either two or three MicroPDF417 row address codeword columns ("row address columns"). The allowed MicroPDF417 bar code variants and their characteristics are shown in FIG. 1. As can be seen from the FIG. 1, the preferred embodiment of the invention can support twenty four different bar code variants, with each row of the table in FIG. 1 describing a different variant. For example, the variant described by the top row of the table of FIG. 1, referenced by the reference numeral 1, consists of two row address codeword columns, one data codeword column and fourteen rows of codewords. This variant has six error correction codewords in the data region. The variant described by the bottom row of the table in FIG. 1, referenced by the reference numeral 2 consists of three row address codeword columns, four data codeword columns and thirty eight rows of codewords. The variant has thirty eight error correction codewords in the data region.

FIGS. 2 a, b, c, d, e and f illustrate some of the bar code variants of the MicroPDF417 symbology. FIG. 2a illustrates a one-by-fourteen bar code variant, having one data column and fourteen rows of codewords. This bar code variant illustration corresponds to the variant description of reference numeral 1 of FIG. 1. FIG. 2b illustrates a two-by-seventeen bar code variant. FIG. 2c illustrates a three-by-eighteen bar code variant. FIG. 2d illustrates a three-by-thirty bar code variant. FIG. 2e illustrates a four-by-fourteen bar code variant. FIG. 2f illustrates a four-by-twenty two bar code variant.

Figure 3:
FIG. 3 is table showing a set of available MicroPDF417 row address patterns.

Each MicroPDF417 Row Address codeword belongs to a set of fifty two row address codewords and appears as a unique pattern of three bars and three spaces, which always begins with a bar and ends with a space, occupying a total of 9 modules. In addition, there is an extra 1-module bar on the right edge of the rightmost row address codeword within a row. This bar is used as a stop character. The fifty two row address codewords ("patterns") and their associated pattern numbers are shown in FIG. 3. For the sake of simplicity, the Stop character is not shown. Reference numeral 3 points to a row address codeword ("pattern") number 10. Starting from the left side, the pattern is made up of the following bar/space sequence: a three-module wide bar, followed by a one-module wide space, followed by a one-module wide bar, followed by a two-module wide space, followed by a one-module wide bar, followed by a one-module wide space.

The row address codewords within any row address column of a bar code, form a subset of the complete set of FIG. 3. Each subset implicitly encodes a bar code variant having a predetermined number of rows of codewords. The subsets for all the variants are shown in FIGS. 5a and 5b.

According to the preferred embodiment, any subset of MicroPDF417 Row Address patterns is arranged in such order that the adjacent patterns within a row address column differ by only one module. This specific arrangement and sequence of the Row Address patterns has been chosen to minimize the signal interference from adjacent rows and to increase the probability of decoding the true row address codeword, thus maximizing the scanning readability of the row address codeword when printed at small row heights. All the data codewords are located in between the left and right row address codewords. As described in the PDF417 patent, all the PDF417 codewords are divided into three clusters of bar-space patterns, or (n,k) patterns with n=17 and k=4, with each cluster being able to encode a full information character set. Each row of codewords contains data codewords belonging to one of the three sequentially alternating codeword clusters. Also, there is a correspondence between the row number and the cluster number of the data codewords used in a particular row. Any residual signal interference from the adjacent row address patterns is detected and corrected, using the cluster number of the PDF417 data codeword adjacent to the decoded row address pattern. For example: assume we are scanning the bar code with a laser scanner, and the bar code is designed so that:

row 1 always contains codewords belonging to cluster 0,
row 2 always contains codewords belonging to cluster 3, and
row 3 always contains codewords belonging to cluster 6.

Assume also that the laser beam, scanning across the rows, passes in between the left row 2 and the left row 1 row address codewords, and afterward passes across a decodable row 1 data codeword belonging to the cluster number 0 and located next to the left row 1 row address codeword. Having only one module difference in the row indicators' content causes the ambiguity in the codeword's placement to be limited to one of the two adjacent rows, either row 1 or row 2. This ambiguity is resolved by the fact that the codeword from cluster 0 could only be located in row 1. The fact that row 1 contains only cluster 0 codewords, and row 2 contains only cluster 3 codewords forces the decoder to resolve the row address codeword ambiguity in favor of row 1.

This type of row error correction scheme improves tolerance to errors caused by the laser beam crossing two rows of bars and spaces simultaneously. One can reduce the vertical to horizontal ratio of the individual module dimensions, thus increasing the probability of row crosstalk, and still be able to properly decode the row address and the data codeword's location. Reduction of the vertical dimension of the modules in every row reduces the overall vertical size of the label.

In addition to providing row location information, some MicroPDF417 row address codewords also provide for the detection of the scan direction across a symbol (i.e., whether a scan was a forward scan, in which case the Left Row Address Pattern was scanned first, or a reverse scan, in which case the Right Row Address Pattern was scanned first). As shown in FIG. 3, approximately one-half of the patterns begin with a one-module bar. Since MicroPDF417 Right Row Address Patterns are terminated by a one-module bar, it is possible to misinterpret a reverse scan of those patterns as a forward scan (yielding an incorrect row number). Starting from the left, the patterns number 1–4, 7–11, 14–17, 20–23, 26, 27 begin with a two-module bar, or a three-module bar. Because the left side of any one of these patterns can not be confused with the one-module Stop character, that might appear on the right of the rightmost row address codeword, these patterns help to determine the direction of the scan and are called directionally unambiguous patterns.

All MicroPDF417 symbols contain at least two MicroPDF417 Row Address codeword columns (separated from each other by one or more data columns), and every codeword column is adjacent to at least one Row Address codeword column. The Row address patterns are placed at the left and right ends of each row; the rightmost pattern is terminated by an additional 1-module bar. A Center Row Address pattern, present only in the three and four data column variant, appears between the second and third data codewords.

FIG. 4 illustrates the row structure of a "two data column" variant of the MicroPDF417 bar code.

1. A leading Quiet Zone, 12, represents a bar code substrate region which is free of any graphical information.
2. A Left MicroPDF417 Row Address pattern, 14, represents a row address codeword. According to the preferred embodiment of the invention, each row address codeword contains a unique bar/space pattern and is encoded using (9,3) gray code. The left row address codeword is also used as a nine module wide start pattern.
3. The Left MicroPDF417 Row address codeword, 14, is followed by two PDF417 data codewords, represented by the reference numerals 16 and 17, respectively.
4. Reference numeral 19 represents a Right MicroPDF417 Row Address codeword.
5. An additional trailing one-module bar, 21, acts as a stop pattern and terminates the Right MicroPDF417 Row Address codeword.
6. A trailing Quiet Zone, 23, completes the row structure. Just like the leading Quiet Zone, 12, the trailing Quite Zone, 23, has to be free of any graphical characters. The required width of the left and right quite zones depends upon the specific decode algorithm.

The three and four data column variants have a center MicroPDF417 Row Address codeword located in the middle of the row. The structure of those variants, scanning from left to right, appears as follows: the leading quite zone, a Left Row address codeword, two PDF417 data codewords; center MicroPDF417 Row Address codeword; one or two PDF417 data codewords,(one data codeword for the three data column variant and two data codewords for the four data column variant); a right MicroPDF417 Row Address codeword; the one-module stop pattern; and the trailing quite zone. By placing every data codeword in close proximity to a row address codeword allows one to correctly identify the location of the data codeword within the bar code structure, once the data codeword has been decoded.

Because the set of row address codewords of FIG. 3 is a cyclical sequence of gray coded patterns (pattern num. 52 differs from the pattern num. 1 by only one module), the minimum-difference property of adjacent row patterns would also hold true if the patterns were "rotated" any arbitrary amount. For instance, rotating upward by two rows would make Pattern Num. 3 the first pattern in the table, and Pattern Num. 1 and Pattern Num. 2 would appear last, immediately below Pattern Num. 52. After rotation, it remains true that any two adjacent patterns differ by only one module. As part of the discrimination between the different variants of the MicroPDF417, the left, the center (if present) and the right row address columns utilize seven "rotations" of the available set of fifty two row address patterns, taken at seven different starting points. The term "rotation distance", also called "D", hereinafter means the amount of rotation of row address codewords of a row address column with respect to the next closest left row address column. Rotation of the row address codewords in FIG. 3 is zero. The formula for calculating the rotation distance is:

D=Right Pattern Number−Left Pattern Number if D<0,
   then D=D+52

Once rotation of the row address codewords has been performed, the row address codewords in any given row form a sequential row grouping. The preferred embodiment of the invention uses groupings of two row address codewords, starting from the right. For example, the two row address codewords of FIG. 4, reference numbers 14 and 19, form a distinct sequential row grouping "reference 19, reference 14". This sequential row grouping implicitly encodes a bar code variant having no more than two columns of data codewords. Referring back to FIG. 1, three or four data column variants have three row address codewords in every row. In those cases there will be two sequential row groupings for every row of codewords. One grouping will contain a Right and a Center row address codewords, and the other grouping will contain a Center and a Left row address codewords.

FIGS. 5a and 5b show how the different row address subsets and the sequential row groupings are used to encode different MicroPDF417 bar code variants. The seven "rotations," and the mapping of these pattern combinations to row numbers, are also shown.

FIGS. 5a specifies the left, and right row address patterns corresponding to each row of each MicroPDF417 one and two data column variants. FIG. 5b specifies the left, center and right row address patterns corresponding to each row of each MicroPDF417 three and four data column variants. The standard PDF417 symbol characters representing data and/or error correction codewords within each row, conform to the cluster number that is again determined from FIGS. 5a and 5b. The symbol is encoded row by row, taking c (the number of data columns) codewords into each row.

The rotations help to differentiate the one and two data column variants from the three and four data column variants. The additional differentiation between the one and two data column variants is achieved by taking into account the width of the bar code. The additional differentiation between the three and four data column variants is also achieved by taking into account the width of the bar code and the physical distance from the center row address column to the right row address column.

Reference number 24 points to a column showing the sequence of left row address patterns (Left RAP) used to encode all the MicroPDF4 17 variants. This column is identical for FIGS. 5a and 5b.

Reference number 25 points to a column of cluster numbers of the data codewords to be used in each row of any variant, with reference to the left row address pattern of each variant. For example, cluster 0 is used to encode data codewords on every row whose left row address pattern is numbered 10 (see FIG. 3), even though in the 1-by-20 variant, the right row address pattern is numbered 17. This column is also identical for FIGS. 5a and 5b.

The remainder of FIG. 5a shows the variants of one and two data column bar codes and their corresponding right row address column rotations. FIG. 5a shows that each of the distinct column size variants has at least two defined rotations of the right row address codewords. This doubles the number of row size variants that can be distinguished. Two of the one-column variants have the right address column with a rotation distance of 0, reference numeral 26. The other three one-column variants have a right address column with rotation distance of 7, reference numeral 27. Two of the two-column variants also have a right address column with a rotation distance of 0, reference number 26. The other three of the two-column variants also have a right address column with rotation distance of 7, reference number 27. The variants having the same number of data columns and the same rotation of the right row address column differ in the number of row.

The remainder of FIG. 5b shows the variants of three and four data column bar codes and their corresponding center and right row address column rotations. Reference numeral 28 represents the column of the center row address patterns. The center row address column is located a fixed physical distance of two data columns away from the left row address column, and has a fixed rotation distance of 14 from the left row address column. The raining part of FIG. 5b shows four different rotations of the right row address patterns relative to the center row address patterns and also shows the allowed row address pattern subsets for each of the rotations. There are a total of seven four-column variants and seven three-column variants. Reference numeral 29 corresponds to a three and four column variant having right row address column rotation distance of twenty one. Reference numeral 30 corresponds to a three and four column variants having right row address column rotation distance of twenty eight. Reference numeral 31 corresponds to a three and four column variants having right row address column rotation distance of thirty five. Reference numeral 32 corresponds to a three and four column variants having right row address column rotation distance of forty two.

For example, the four-by-eighteen variant, represented by the reference numeral 20, has a center row address column to left row address column rotation distance of 14, and a right row address column to center row address column rotation distance of forty two. Row one of the bar variant has a left row address pattern number 10 (FIG. 3, reference 3), a center row address pattern number 24, and the right row address pattern number 14. Also, the left and the right halves of the four-column variant have a distinct rotation compared to the two-column bar code variant. This allows one to distinguish a scan across the left or the right half of the four-column variant from a complete scan across the two-column variant.

In addition, further study of FIGS. 5a and 5b shows that the left side of a MicroPDF417 symbol never uses pattern numbers above thirty eight. Thus, many of the patterns beginning with a one-module bar are also unambiguous, because when scanned in the reverse direction, they decode to a pattern number greater than thirty eight. The direction of every prior or future scan is determined once any one of the directionally unambiguous row address pattern is encountered. The decode algorithm presented below, describes the preferred way of decoding a MicroPDF417 symbol.

Reference Decode Algorithm for MicroPDF417

A MicroPDF417 symbol shall be decoded in a series of scan lines running across the symbol that cross at least one start or stop character, but not necessarily row by row. It is possible to decode the symbol if the scan line crosses two or more rows by using the cluster number. The decoding of symbol character X-sequences, for the row address patterns as well as the standard PDF417 symbol characters, shall be achieved by using 'edge to similar edge' (e) measurements illustrated in FIGS. 7 and 8. For the purpose of this algorithm, X-sequence means a non-normalized width of a sequence of bars and spaces.

The MicroPDF417 symbol shall be decoded in three phases:
1. Initialization—to establish the symbol matrix.
2. Filling the matrix
3. Interpretation.

Phases 1 and 2 both perform line-by-line decoding using the reference line decode algorithm, described below. The algorithm differs slightly, depending upon which of the two decode phases is being attempted.

Phase 1: Initialization

A sufficient number of line decodes using the reference line decode algorithm shall be performed at the start of the decode process to establish the number of columns c of the symbol, and the characteristic rotational distance D of its row address patterns. This is accomplished by collecting scans until at least three different rows have been identified with the same indicated values for c and D. During this phase, each useable scan line must contain at least two valid nearest-neighbor row address patterns. For a one-column or two-column symbol, the left and right row address patterns must be scanned in order to establish D; for a three or four data column symbol, the center plus right row address patterns must be scanned in order to establish D. For each such scan to be considered useable, at least one valid PDF417 data codeword must be adjacent to at least one of these row address patterns; furthermore, the values of these two row address patterns, and the cluster number(s) of the intervening codeword(s), must be consistent with each other.

If a valid center row pattern was detected, then the specific combination of decoded row address patterns is sufficient to detect that the scan crossed either or both halves of a three- or four- data column symbol rather than a one- or two- data column symbol (by checking for a valid pairing of patterns within FIGS. 5a and 5b. When both a left and a right row address pattern were decoded, but no center pattern was decoded, then the relative distance between the left and right patterns indicates the number of columns. Specifically, the distance between the patterns will (before accounting for possible acceleration of the scanning beam) be either approximately equal to the sum of the address patterns (for a one-column symbol), twice their sum (for a two-column symbol), or 3.5 or 4.5 times their sum (for a three or four data column symbol, respectively). To ensure proper discrimination of column size, discard scans during this phase that contain a left and right address pattern that appear far enough apart to indicate a three or four column symbol, if the appropriate center row address pattern was not also decoded.

A further requirement of both this phase and the next phase is that scan direction must be established for each useable scan. Directionality of a scan may be established in either of two ways: either because at least one of the valid row indicator patterns is directionally-unambiguous, or because the directionality of the current physical scan line has been established based on correlation with previous scans (of the same trigger pull or scan session) that did contain directionally-unambiguous patterns (for instance, it may have been established that odd-numbered scans are in the forward direction).

After the number of columns has been determined, a matrix shall be established which has a number of columns equal to the number of data columns of the symbol being decoded, and which has 38 rows, so that codewords can be placed in the matrix based upon their address pattern numbers, even before the actual row numbering for the symbol variant being scanned has been determined.

Phase 2: Filling the Matrix

The following procedure fills the matrix of 38 rows by 1, 2, 3, or 4 columns established by the initialization phase. During this phase, after each scan line has been processed, the decoded codewords are placed into this matrix at a matrix row address (in the range 1 to 38) equal to the bar code's left row indicator pattern number (which, using FIGS. 5a and 5b, may be calculated from the decoded data of that scan, even if only the right row codeword was actually decoded). During this phase, it is possible to utilize scans that contain only one decodable row address pattern of a one- or two- data column symbol, or that contain any two of the three row address patterns of a three or four data column symbol.

1. Set the initial value of the erasure count v to be equal to r * c, using the largest value of r that is available for any MicroPDF417 variant with exactly c data columns and the characteristic rotational distance D.
2. For each scan, attempt to decode as many codewords as the number of columns c of the matrix.
3. Valid decode results are placed in the matrix at their appropriate positions determined by the row address patterns (the physical row numbers of the symbol may not be known until relatively late in this phase) and the cluster values.

If row crossing occurs, the cluster number shall be used to interpolate the correct row address pattern number for each individual valid codeword.

Refer to FIG. 6 for a pictorial representation of the following example. The diagonal line crossing the table of FIG. 6 represents an orientation of a single scan of the laser beam. A decoded scan of a four-data-column by 38-row symbol has valid margins and has a left row address pattern with pattern number 22 (RAP22), center row address pattern with pattern number 35 (RAP35), and a right row address pattern with pattern number 3(RAP3). Although there are 4 columns in the matrix, this scan line has only three decodable data codewords because it did not remain entirely in the one row for the full transaction; however, the position of the 'missing' codeword is known from element timings. As shown in FIG. 6 the scanning beam crossed the codewords belonging to different clusters in the following left-to-right order: Cluster 6, Cluster 6, Cluster unknown, Cluster 3. Using matrix notation of (row, column), where row =left row address pattern number (from 1 to 38) and where col is numbered from 1 to 4, the codewords are filled in the positions:

(21, 1), (21,2), (unknown), (20, 4).

Because the first data codeword belongs to cluster number 6, rather than 0, the first codeword was placed at matrix address 21, even though the decoded left row address was 22.

4. As the matrix is being filled, the erasure count v is reduced by one for each valid data codeword.
5. Once at least two symbol rows have been decoded that are unique to only one MicroPDF417 variant with c columns (based on the information in FIGS. 5a and 5b), the actual total number of rows r, and thus the number of error correction codewords k, are now known. If the actual value of r is smaller than the value that was assumed at the start of this phase, the erasure count v is decremented accordingly.

Error recovery may be attempted when the number of unknown codewords (the erasure count v) satisfies the equation:

$v \leq k-2$ k=number of error correction codewords
v=erasure count

6. If error recovery fails, then more codewords shall be collected.

Error detection and correction is described in detail in the PDF417 patent.

Phase 3: Interpretation

Once error correction has been completed, the interpretation part of the algorithm translates the data codewords to the source text according to the rules of the PDF417 symbology.

Reference Line-Decode Algorithm

Figure 12:
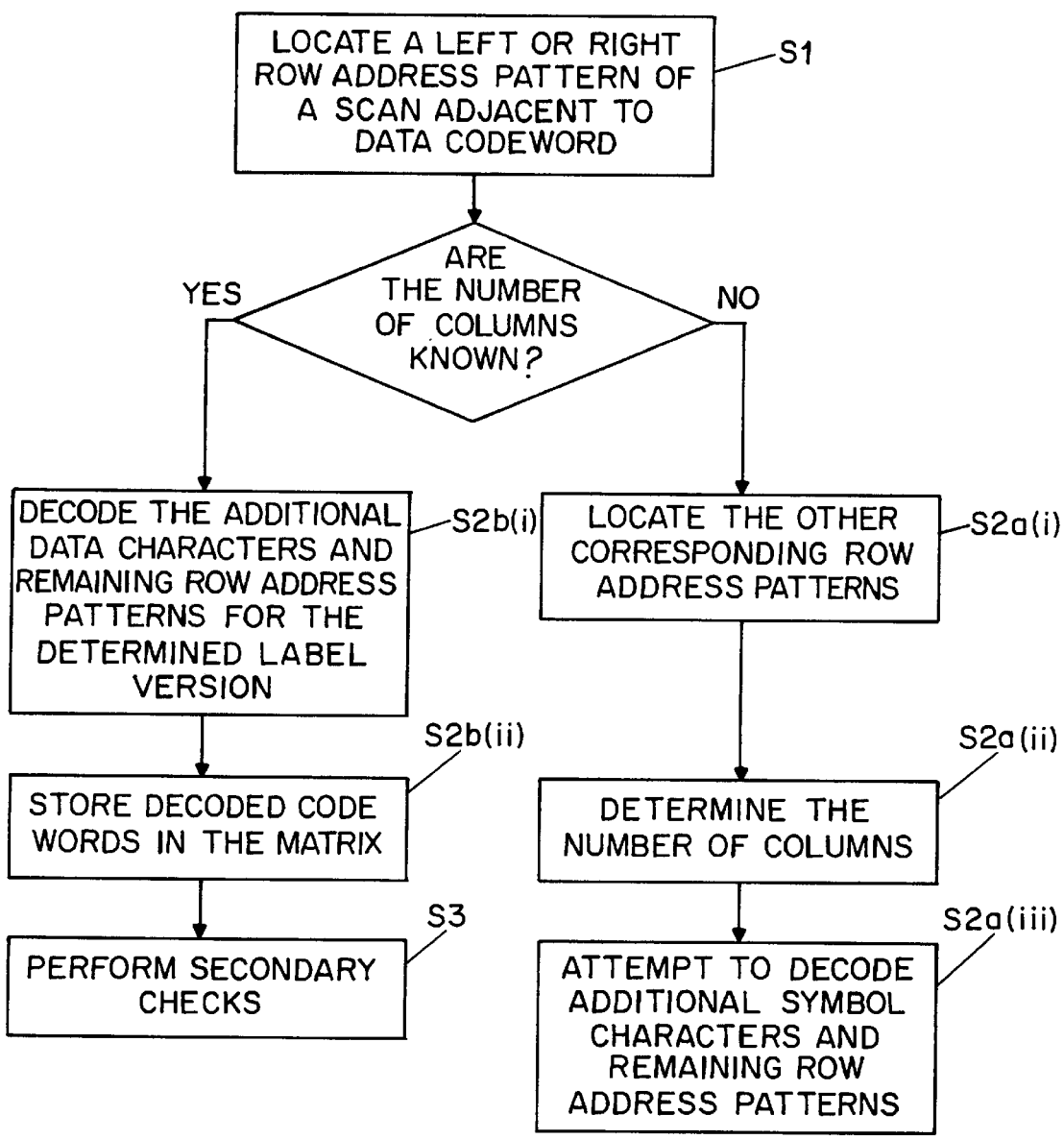
FIG. 12 is a flowchart of the Reference Line Decode Algorithm of the present invention.

The requirements for successful processing of a scan line differ slightly, depending upon whether the decoding process is in its first or its second phase. During the initialization of the matrix phase, a decodable scan line shall contain at least two nearest-neighbor row address patterns (including either one or both of the left and right patterns, with adjacent quiet zone). During filling the matrix phase, a decodable scan line shall contain at least one row address pattern (but either the left or the right shall be present, with adjacent quiet zone). An additional requirement during phase 1, for three- or four- data column symbols, is that the center row address pattern also be present. During either phase, every scan shall contain one or more symbol characters in the data region, and at least one of these data region characters shall be adjacent to a left or right row address pattern. During either phase, a decodable scan line may cross more than one row. The algorithm shown in FIG. 12, contains the following steps to decode the line:

1. Step S-1 locates a left or right row address pattern, using the steps of the Reference Character-Decode Algorithm for row address pattern, presented below, that is adjacent to a standard PDF417 symbol character. The Reference Character-decode algorithm for PDF417 symbol characters is also presented below. Confirm the presence of the row address pattern's adjacent quiet zone (and, for a right pattern, its single-module stop bar as well). In performing this step, scan directionality is determined as follows:
   a) If at least one of the address patterns is directionally-unambiguous, then this can be used to set direction for decoding the scan being processed.
   b) If none of the patterns are directionally-unambiguous, but if a correlation between scan number and scan direction has been established from a previous scan, then that correlation can be used to set scan direction for the scan being processed.
   c) If neither a) nor b) is true, then the scan is discarded.
2. After finding a left or right row address pattern adjacent to a standard PDF417 symbol character using the procedures of step 1 above:
   a) During Phase 1, as shown in step S-2a(i) when the number of columns is unknown, attempt to decode in parallel both an additional symbol character and a second row address pattern at every valid starting position (relative to the row address codeword/data codeword pair found in step 1 above), until a second row address codeword, consistent with the results of step 1, is confirmed. As shown in step S-2a(ii), from this pair of confirmed row address patterns, the apparent number of columns in the matrix, as indicated by this individual scan, can be determined. Now, attempt to decode as many additional symbol characters as is appropriate for the number of data columns in the matrix; also, attempt to decode the remaining row address pattern, if any, at the appropriate location for this number of data columns. This is shown in step S-2a(iii).

b) During Phase 2, as shown in step S-2b(i), when the number of columns is known, attempt to decode as many additional symbol characters as is appropriate for the number of data columns in the matrix; also, attempt to decode the remaining row address pattern (s) at the appropriate location(s) for this number of data columns. In step S-2b(ii), using the row address patterns and the symbol character cluster numbers, store the decoded codeword values at the appropriate locations in the matrix.

c) In performing either a) or b), use the direction derived from step 1 above.

Decode the row address pattern X-sequences via a Character-Decode Algorithm for MicroPDF417 row address patterns; decode the symbol character X-sequences via a Character-Decode Algorithm for standard PDF417 symbol characters.

3. In step S-3, perform such other secondary checks (scan acceleration, absolute timing dimensions, quiet zones etc.) as deemed prudent and appropriate for the particular characteristics of the reading device.

Reference Character-Decode Algorithm for MicroPDF417 row address patterns

Figure 7:
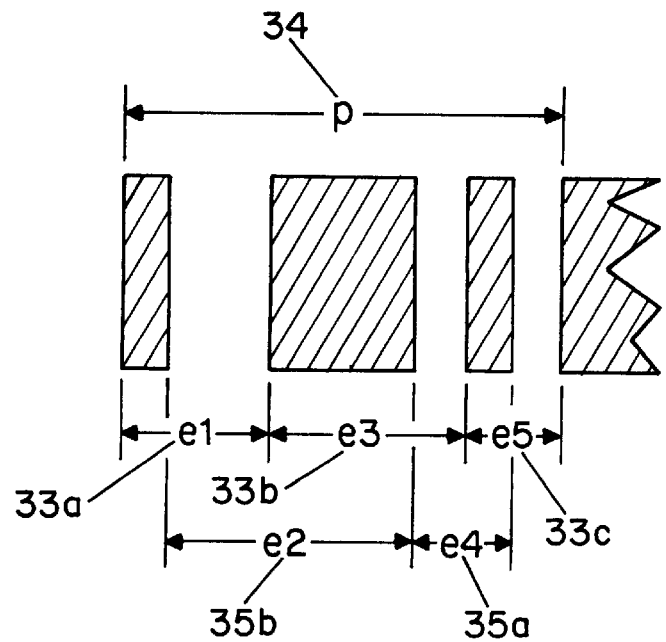
FIG. 7 is an illustration of a single MicroPDF417 row address pattern
Figure 8:
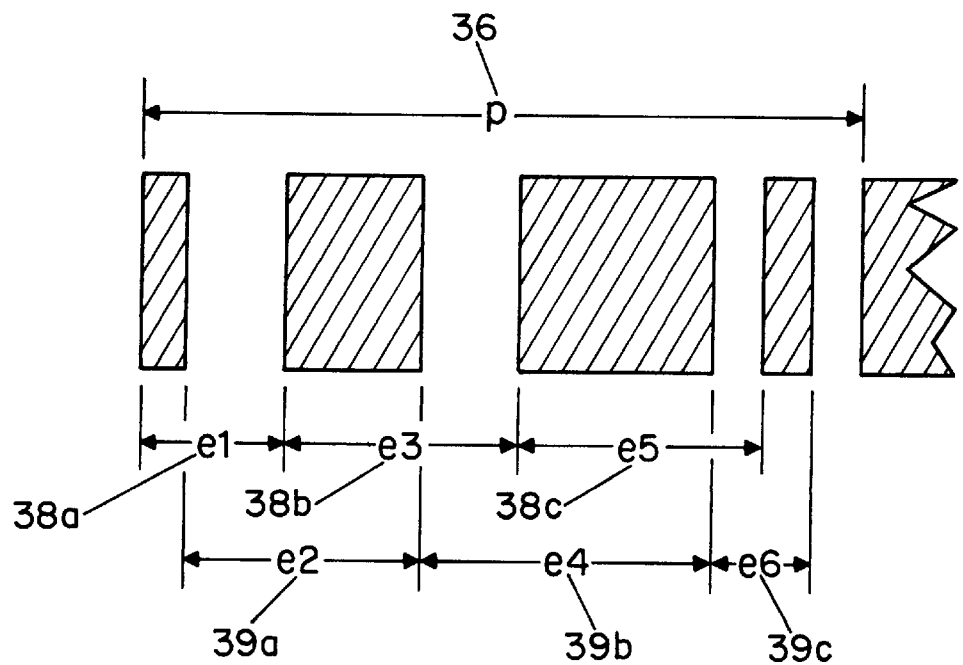
FIG. 8 is an illustration of a single MicroPDF417 data codeword.

For the purpose of interpreting FIGS. 7 and 8, "p" represents a total width of all the bars and spaces of any given codeword, and "e" means edge-to-adjacent-similar edge distance within the codeword.

1. For each row address pattern X-sequence, calculate the following set of width measurements as per FIG. 7. FIG. 7 illustrates a nine-module MicroPDF417 row address pattern. Reference numeral 34 represents "p", the total width of the row address pattern. Variables e1, e3 and e5, represented by the reference numerals 33a, 33b and 33c respectively, are non-normalized measurements of the distance from the left edge of any given bar to the left edge of the adjacent bar. Variables e2, and e4, represented by the reference numerals 35a and 35b respectively, are non-normalized measurements of the distance from the right edge of any given bar to the right edge of the adjacent bar.

2. Convert measurements e1, e2, e3, e4, and e5 to normalized values E1, E2, E3, E4, and E5 which will represent the integral module width of these measurements. The following method is used for the $i^{th}$ value:

If $1.5p/9 \leq e_i < 2.5p/9$, then Ei=2

If $2.5p/9 \leq e_i < 3.5p/9$, then Ei=3

If $3.5p/9 \leq e_i < 4.5p/9$, then Ei=4

If $4.5p/9 \leq e_i < 5.5p/9$, then Ei=5

Otherwise the symbol character X-sequence is in error.

3. Retrieve the pattern number from the row address pattern table using the five values E1, E2, E3, E4, and E5 as the key. These values can be calculated directly from the X-sequence values given in FIG. 3.

Reference Character-Decode Algorithm for standard PDF417 symbol characters

1. For each symbol character X-sequence (including start and stop character) calculate the following width measurements as per FIG. 8. FIG. 8 illustrates a seventeen-module MicroPDF417 data codeword ("pattern"). Reference numeral 36 represents "p", the total width of the data pattern. Variables e1, e3 and e5 of the data pattern, represented by the reference numerals 38a, 38b and 38c respectively, are nonnormalized measurements of the distance from the left edge of any given bar to the left edge of the adjacent bar. Variables e2, e4 and e6, represented by the reference numerals 38a, 38b and 38c and respectively, are non-normalized measurements of the distance from the right edge of any given bar to the right edge of the adjacent bar.

2. Convert measurements e1, e2, e3, e4, e5, and e6 to normalized values E1, E2, E3, E4, E5 and E6 which will represent the integral module width of these measurements. The following method is used for the $i^{th}$ value:

If $1.5p/17 \leq e_i < 2.5p/17$, then Ei=2

If $2.5p/17 \leq e_i < 3.5p/17$, then Ei=3

If $3.5p/17 \leq e_i < 4.5p/17$, then Ei=4

If $4.5p/17 \leq e_i < 5.5p/17$, then Ei=5

If $5.5p/17 \leq e_i < 6.5p/17$, then Ei=6

If $6.5p/17 \leq e_i < 7.5p/17$, then Ei=7

If $7.5p/17 \leq e_i < 8.5p/17$, then Ei=8

If $8.5p/17 \leq e_i < 9.5p/17$, then Ei=9

Otherwise the symbol character X-sequence is in error.

3. Compute the symbol character cluster number K by:

$$k = (E1 - E2 + E5 - E6 + 9) \bmod 9$$

The cluster number k shall equal either 0, 3 or 6; otherwise the symbol character and its associated codeword are in error. Retrieve the codeword from the decode table, as per PDF417 patent using the seven values (cluster value k and the values, E1, E2, E3, E4, E5 and E6) as the key. These values can be calculated directly from the X-sequence values given in PDF417 patent. The calculation implicitly uses the cluster number to detect all decode errors caused by single non-systematic one-module edge errors.

End of Algorithm

It should be obvious to one skilled in the art that other decode algorithms are possible. For example, an algorithm that decodes the right to left scans can be constructed by following the logic presented above.

Figure 9:
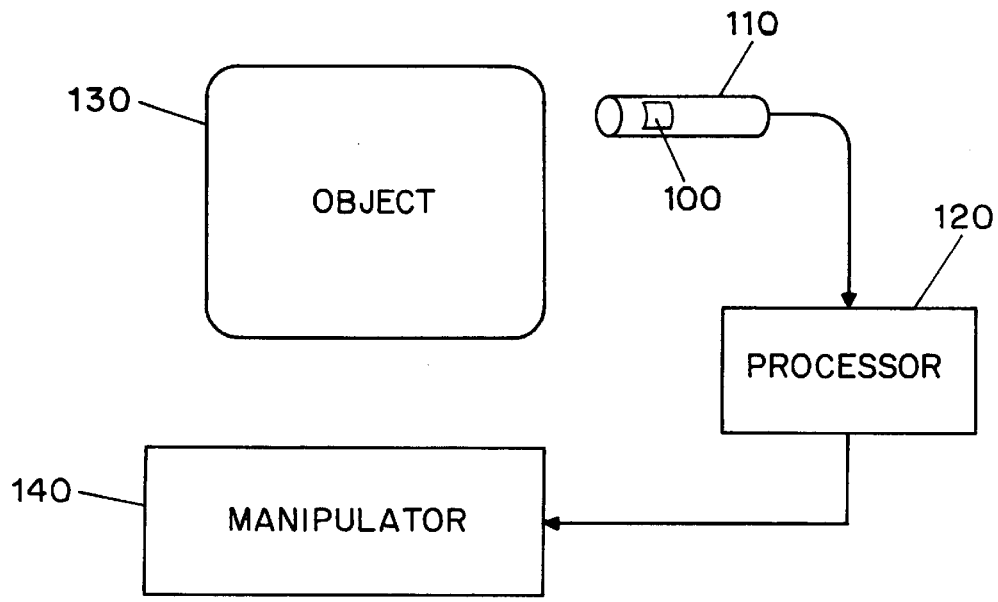
FIG. 9 is a block diagram of a computer system using the two-dimensional bar code symbol in accordance with the invention.

Referring to FIG. 9, a system may be built for using high density, two dimensional bar code symbols (FIG. 2 a-f) created by marking a suitable substrate(e.g. paper) with one or more labels in accordance with the foregoing description. The memory 100 may be combined with a fixed or a movable scanner, 110, for use as a storage device for a suitably programmed computer such as a processor, 120.

For example, a robot might have an on-board computer programmed to control the robot to perform simple tasks, such as selectively moving the object, 130, by means of manipulator, 140. An on-board scanner, 110, might operate as the robot's "eyes" for reading labels of the kind described above. In similar fashion, a conveyor system might include a fixed scanner, 110, and a moving belt that served as the manipulator, 140. The label preferably contains a list of instructions for operating the robot, with the computer on-board. The robot responds to data and instructions contained on the label.

Figure 10:
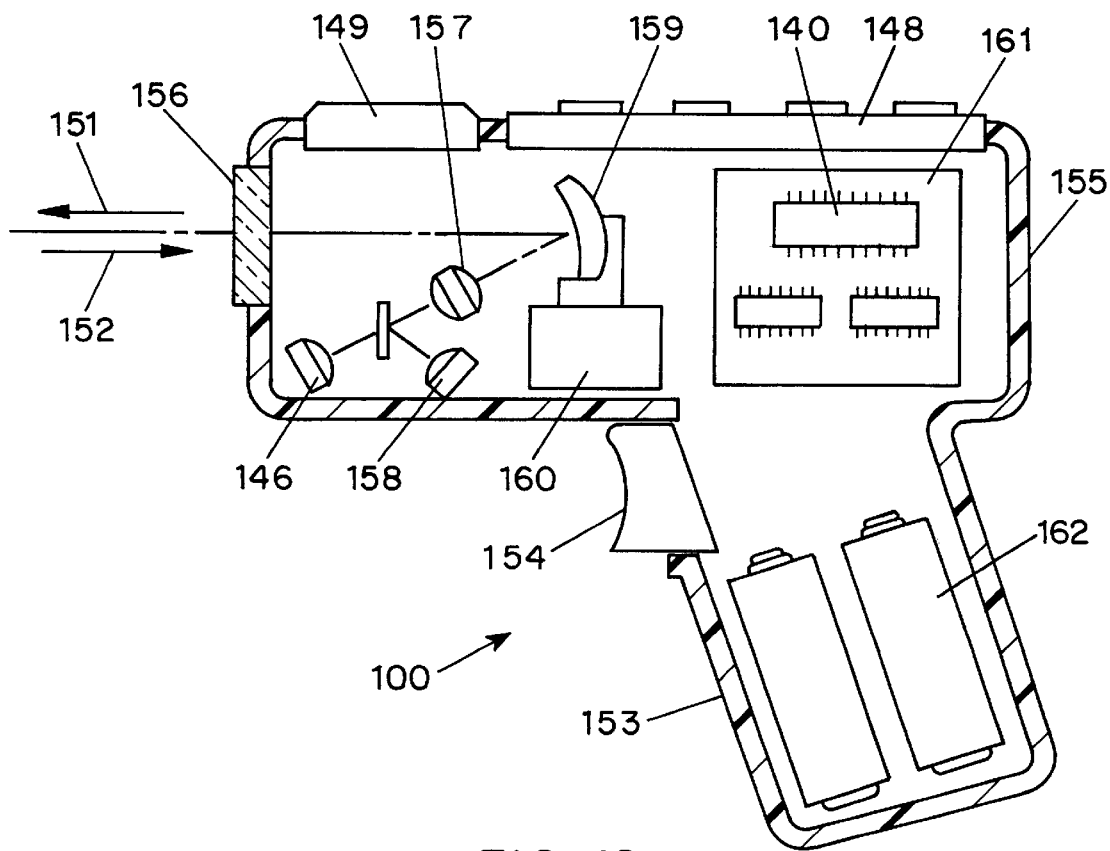
FIG. 10 shows a cross-sectional view of an implementation of a hand-held laser scanner which may be used to implement the present invention.
Figure 11A:
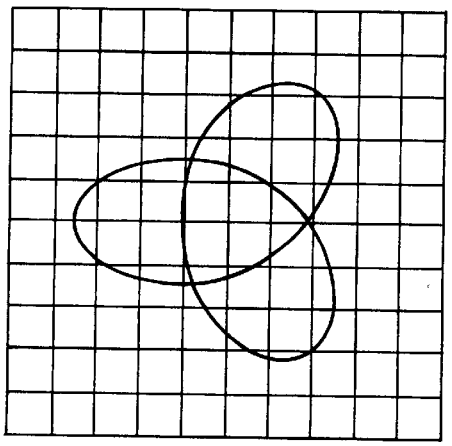
FIG. 11a, b, c, d and e depict various types of laser scanning patterns that may be used in connection with the present invention.
Figure 11B:
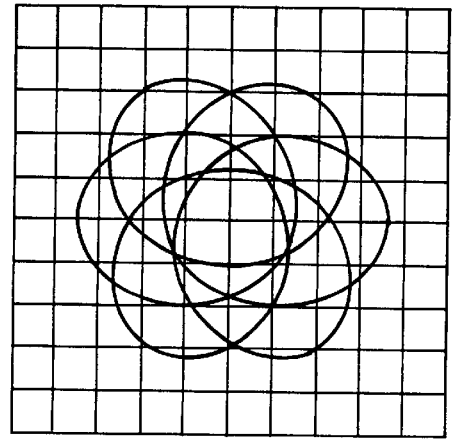
Figure 11C:
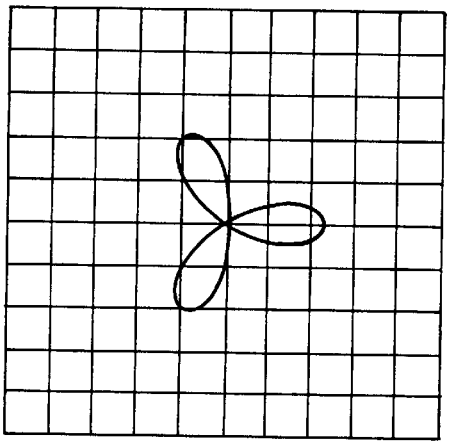
Figure 11D:
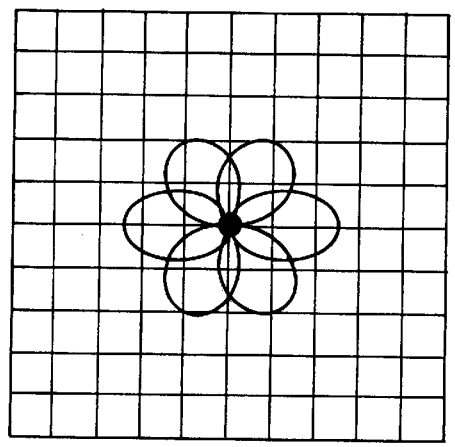
Figure 11E:
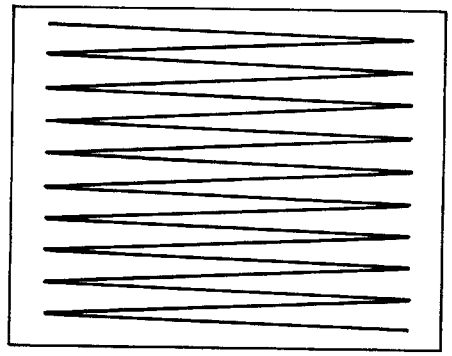

The present invention may be implemented in a hand-held, laser-scanning, bar code reader such as illustrated in FIG. 10. This hand-held device of FIG. 10 is generally of the type disclosed in U.S. Pat. No. 4,760,248 issued to Swartz et al., assigned to Symbol Technologies, Inc. Alternatively, or in addition, features of U.S. Pat. No. 4,387,297 issued to Swartz et al., or U.S. Pat. No. 4,409,470 issued to Shepard et al., both such patents assigned to Symbol Technologies, Inc., may be employed in constructing the bar code reader of FIG. 10. These U.S. Pat. Nos. 4,760,248, 4,387,297 and 4,409,470 are incorporated herein by reference. An outgoing light beam, 151, is generated in the reader, 100, usually by a laser diode or the like, and directed to impinge upon the bar code symbol generally located some distance away from the reader unit. The outgoing beam, 151 is scanned in a fixed linear pattern, or a more complex pattern such as shown in FIG. 11 may be employed and the user positions the hand-held unit so this scan pattern traverses the symbol to be read. A central dark portion, such as in FIG. 11d, may be used for aiming. Other visual techniques may be associated for scan pattern to bar code alignment. Reflected light 152 from the symbol is detected by a light-responsive device 146 in the reader unit, producing serial electrical signals to be processed for identifying the bar code. The reader, 100, is a gun shaped device, having a piston-grip type of handle 153 and movable trigger, 154, employed to allow the user to activate the light beam 151 and detector circuitry when pointed at the symbol to be read, thereby saving battery life if the unit is self-powered. A light-weight plastic housing, 155, contains a laser light source, the detector, 146, the optics and signal processing circuitry, and the CPU, 140, as well as the battery, 162. A light-transmissive window, 156, in the front end of the housing, 155, allows the outgoing beam, 151 to exit and the incoming reflected light 152 to enter. The CPU 140 is located on the circuit board 161. Multiple circuit board designs could also be used. The reader may have a display 149, as well as a manual entry control panel 148.

As seen in FIG. 10, a suitable lens, 157, (or multiple lens system) is used to collimate and focus the scanning beam, 151, onto the bar code symbol at an appropriate reference plane, and this same lens, 157, may be used to focus the reflected light 152 onto a photodetector, 146. A light source, 158, such as a semiconductor laser diode is positioned to introduce a light beam into the axis of the lens, 157, by a partially-silvered mirror and the other lenses or beam-shaping structure as needed, along with an oscillating mirror, 159 which is attached to a scanning motor, 160, activated when the trigger, 154, is pulled. If the light produced by the source 158 is not visible, an aiming light may be included in the optical system, again employing a partially-silvered mirror to introduce the bean into the light path coaxially with the lens, 157. The aiming light if needed, produces a visible-light spot which is scanned just like the laser beam; the user employs this visible light to aim the reader unit at the symbol before pulling the trigger, 154.

FIG. 11 shows possible scan patterns which could be used in scanning the bar code. A bar code reader may use a particular pattern or alternate between the patterns. The preferred scan pattern is a raster pattern show in FIG. 1 e.

The preferred embodiment of the invention has been describe above. It should be obvious to one skilled in the art that other embodiments of the present invention are possible without destroying the spirit of the invention.

For example, only one row address codeword per row could be used. Although it is preferable to have at least one row address codeword adjacent to each data codeword, the number of data columns located in between any two row address columns could be varied.

One could increase the number of data columns in a bar code by increasing the number of row address/data codeword groupings.

One could also vary the number of data columns and their placement with respect to the row address columns. For example, it is possible to have the following sequence of relative column placements:

1) Row Address column; Data column; Data column; Data column; Row Address column.
2) Data column; Row Address column; Data column; Data column; Row Address column; Data column.

One could use other sequential relationship between the row address columns.

Any other implicit schemes may be used to indicate different security levels.

One could encode the data content of the bar code using coding methods other than PDF417. One could also change the n and/or the k values of both the row address codeword and/or the data codeword. Non (n,k) gray code could be used for encoding the relative spacial positions of the corresponding codewords. Other cross-talk minimizing arrangement of codes, other than gray codes could be used for encoding the relative spacial positions of the corresponding codewords.

One could develop printing devices to encode such bar codes based upon optimization function that would select the appropriate bar code parameters for a particular application.

Bar code readers used to decode the bar codes printed according to the invention may contain wireless communication transceivers for communication with the host terminal.

We claim:

1. A two-dimensional machine readable bar code label encoded with a first set of information using a symbology having a plurality of predefined version variants, each of said predefined version variants having a set of variant components including a predetermined number of rows of codewords, a predetermined number of columns of codewords, and a predetermined number of error correction codewords, said label comprising:

(a) a plurality of data codewords for explicit encoding of said first set of information; and
(b) a plurality of non-data codewords spatially associated with said plurality of data codewords, said plurality of non-data codewords having at least one symbology variant component implicitly encoded therein.

2. The two-dimensional machine readable label according to claim 1, wherein each one of said non-data codewords belongs to a set of non-data codewords and said each one of said non-data codewords has a unique mark-and-space pattern.

3. The two-dimensional machine readable label according to claim 2, wherein the spatial association of the pluralities of data and non-data codewords is a row and column matrix association and each plurality of the data and non-data codewords is encoded along a row orientation.

4. The two-dimensional machine readable label according to claim 3, wherein each of the data and non-data codewords is encoded along a row orientation.

5. The two-dimensional machine readable label according to claim 4, wherein said label includes at least one column of non-data codewords and at least one column of data codewords.

6. The two-dimensional machine readable label according to claim 5, wherein each row of codewords includes a row-subset of non-data codewords chosen from the set of non-data codewords, said row-subset comprising at least one non-data codeword.

7. The two-dimensional machine readable label according to claim 6, wherein a majority of said row-subsets of non-data codewords comprises at least one directionally distinguishable non-data codeword.

8. The two-dimensional machine readable label according to claim 6, wherein the row-subset of non-data codewords comprises at least two non-data codewords and implicitly encodes at least one of said variant components.

9. The two-dimensional machine readable label according to claim 8, wherein each non-data codeword explicitly encodes a row locating information.

10. The two-dimensional machine readable label according to claim 9, wherein said plurality of non-data codewords is encoded using (n,k) encoding scheme.

11. The two-dimensional machine readable label according to claim 10, wherein said (n,k) encoding scheme is a (3, 10) encoding scheme.

12. The two-dimensional machine readable label according to claim 10, wherein said (n,k) encoding scheme is an (n,k) graycoding scheme.

13. The two-dimensional machine readable label according to claim 12, wherein said (n,k) graycoding scheme is a (3,10) graycoding scheme.

14. The two-dimensional machine readable label according to claim 13, wherein said plurality of data codewords is encoded using PDF417 encoding scheme.

15. The two-dimensional machine readable label according to claim 6, wherein the non-data codeword column comprises a column-subset of non-data codewords chosen from the set of available non-data codewords, said column-subset implicitly encoding at least one of said variant components.

16. The two-dimensional machine readable label according to claim 15, wherein each non-data codeword explicitly encodes a row locating information.

17. The two-dimensional machine readable label according to claim 16, wherein said plurality of non-data codewords is encoded using (n,k) encoding scheme.

18. The two-dimensional machine readable label according to claim 17, wherein said (n,k) encoding scheme is a (3, 10) encoding scheme.

19. The two-dimensional machine readable label according to claim 17, wherein said (n,k) encoding scheme is an (n,k) graycoding scheme.

20. The two-dimensional machine readable label according to claim 19, wherein said (n,k) graycoding scheme is a (3,10) graycoding scheme.

21. The two-dimensional machine readable label according to claim 20, wherein said plurality of data codewords is encoded using PDF417 encoding scheme.

22. The two-dimensional machine readable label according to claim 8, wherein the non-data codeword column comprises a column-subset of non-data codewords chosen from the set of available non-data codewords, said column-subset implicitly encodes at least one of said variant components.

23. The two-dimensional machine readable label according to claim 22, wherein each non-data codeword explicitly encodes a row locating information.

24. The two-dimensional machine readable label according to claim 23, wherein said plurality of non-data codewords is encoded using (n,k) encoding scheme.

25. The two-dimensional machine readable label according to claim 24, wherein said (n,k) encoding scheme is a (3, 10) encoding scheme.

26. The two-dimensional machine readable label according to claim 24, wherein said (n,k) encoding scheme is an (n,k) graycoding scheme.

27. The two-dimensional machine readable label according to claim 26, wherein said (n,k) graycoding scheme is a (3,10) graycoding scheme.

28. The two-dimensional machine readable label according to claim 27, wherein said plurality of data codewords is encoded using PDF417 encoding scheme.

29. A method of encoding a two-dimensional machine readable bar code label encoded with a first set of information using a symbology having a plurality of predefined version variants, each of said predefined version variants having a set of variant components, said set of variant components including a predetermined number of rows of codewords, a predetermined number of columns of codewords, and a predetermined number of error correction codewords, said method comprising the steps of:

(a) explicitly encoding a plurality of data codewords with the first set of information; and (b) implicitly encoding at least one symbology variant component into a plurality of non-data codewords, said plurality of non-data codewords being spatially associated with said plurality of data codewords.

30. The method according to claim 29, wherein each one of said non-data codewords belongs to a set of available non-data codewords and has a unique mark/space pattern.

31. The method according to claim 30, wherein the spatial association of the pluralities of data and non-data codewords is a row and column matrix association and each plurality of the data and non-data codewords is encoded along a row orientation.

32. The method according to claim 31, wherein each of the data and non-data codewords is encoded along a row orientation.

33. The method according to claim 32, wherein said label includes at least one column of non-data codewords and at least one column of data codewords.

34. The method according to claim 33, wherein each row of codewords includes a row-subset of non-data codewords chosen from the set of non-data codewords, said row-subset comprising at least one non-data codeword.

35. The method according to claim 34, wherein a majority of said row-subsets of non-data codewords comprises at least one directionally distinguishable non-data codeword.

36. The method according to claim 34, wherein the row-subset of non-data codewords comprises at least two non-data codewords and implicitly encodes at least one of said variant components.

37. The method according to claim 36, wherein each non-data codeword explicitly encodes a row locating information..

38. The method according to claim 37, wherein said plurality of non-data codewords is encoded using (n,k) encoding scheme.

39. The method according to claim 38, wherein said (n,k) encoding scheme is a (3, 10) encoding scheme.

40. The method according to claim 38, wherein said (n,k) encoding scheme is an (n,k) graycoding scheme.

41. The method according to claim 40, wherein said (n,k) graycoding scheme is a (3,10) graycoding scheme.

42. The method according to claim 41, wherein said plurality of data codewords is encoded using PDF417 encoding scheme.

43. The method according to claim 34, wherein the non-data codeword column comprises a column-subset of non-data codewords chosen from the set of available non-data codewords, said column-subset implicitly encodes at least one of said variant components.

44. The method according to claim 43, wherein each non-data codeword (explicitly encodes a row locating information.

45. The method according to claim 44, wherein said plurality of non-data codewords is encoded using (n,k) encoding scheme.

46. The method according to claim 45, wherein said (n,k) encoding scheme is a (3, 10) encoding scheme.

47. The method according to claim 45, wherein said (n,k) encoding scheme is an (n,k) graycoding scheme.

48. The method according to claim 47, wherein said (n,k) graycoding scheme is a (3,10) graycoding scheme.

49. The method according to claim 48, wherein said plurality of data codewords is encoded using PDF417 encoding scheme.

50. The method according to claim 36, wherein the non-data codeword column comprises a column-subset of non-data codewords chosen from the set of available non-data codewords, said column-subset implicitly encodes at least one of said variant components.

51. The method according to claim 50, wherein each non-data codeword explicitly encodes a row locating information.

52. The method according to claim 51, wherein said plurality of non-data codewords is encoded using (n,k) encoding scheme.

53. The method according to claim 52, wherein said (n,k) encoding scheme is a (3, 10) encoding scheme.

54. The method according to claim 52, wherein said (n,k) encoding scheme is an (n,k) graycoding scheme.

55. The method according to claim 54, wherein said (n,k) graycoding scheme is a (3,10) graycoding scheme.

56. The method according to claim 55, wherein said plurality of data codewords is encoded using PDF417 encoding scheme.

57. A method of encoding a set of information into a two-dimensional machine readable label made up of codewords, said method comprising the steps of:
- (a) encoding said set of information into a plurality of data codewords using a first encoding scheme;
- (b) arranging said plurality of data codewords into a row and column matrix arrangement;
- (c) encoding a sequence information corresponding to data codewords in a particular row into a plurality of non-data codewords using an (N,K) gray-code encoding scheme; and
- (d) spatially associating said pluralities of data and non-data codewords.

* * * * *